US008643693B2

(12) United States Patent
Manjrekar (10) Patent No.: US 8,643,693 B2
(45) Date of Patent: Feb. 4, 2014

(54) SYSTEM AND METHOD FOR PROVIDING TELEVISION VIDEO CONFERENCING USING A COMPUTING DEVICE

(75) Inventor: Santosh Manjrekar, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 432 days.

(21) Appl. No.: 12/981,832

(22) Filed: Dec. 30, 2010

(65) Prior Publication Data

US 2012/0169830 A1  Jul. 5, 2012

(51) Int. Cl.
*H04N 7/14* (2006.01)
(52) U.S. Cl.
USPC ........................................ 348/14.01; 348/14.1
(58) Field of Classification Search
None
See application file for complete search history.

(56) References Cited

U.S. PATENT DOCUMENTS

| 2009/0064252 A1* | 3/2009 | Howarter et al. ............. 725/114 |
| 2011/0236872 A1* | 9/2011 | Taylor ........................... 434/350 |
| 2011/0242266 A1* | 10/2011 | Blackburn et al. ......... 348/14.01 |
| 2012/0072944 A1* | 3/2012 | Felt et al. ........................ 725/25 |

* cited by examiner

*Primary Examiner* — Duc Nguyen
*Assistant Examiner* — Theodore Ndje (57) ABSTRACT

A system and method for providing television video conferencing using a remote computing device is disclosed. The system may comprise an input module of a media manager configured to receive an invite message from a video hub office (VHO) server to enter a video conferencing session with a remote computing device communicatively coupled to at least one of a set-top box and a television. The input module may also be configured to receive video data and audio data from a local input device. The system may comprise a processor module of a media manager configured to convert the video data into a video stream and the audio data into an audio stream and to combine the video stream and the audio stream to form at least one multimedia transport stream. The system may also comprise an output module of a media manager configured to transmit an acceptance of the invite message to the video hub office (VHO) server, and to transmit the multimedia transport stream to the remote computing device to establish the video conferencing session.

25 Claims, 7 Drawing Sheets

SYSTEM AND METHOD FOR PROVIDING TELEVISION VIDEO CONFERENCING USING A COMPUTING DEVICE

BACKGROUND INFORMATION

Video encoding and decoding required for video conferencing is typically processor-intensive and reserved for camera-enabled computing devices capable of performing these operations. Because current computing devices are designed to be small and portable, video displays on such computing devices may also run small. When conducting a video conference session using a small computing device, such as a notebook or tablet computer, the video conferencing window may be even smaller on the display of the computing device. Current television units, on the other hand, are growing in size, dropping in cost, and becoming increasingly accessible to consumers. However, television units and set-top boxes (STBs) are generally ill-equipped to handle the processing requirements needed to support video conferencing. Although custom-built, hi-tech cameras are available to consumers, cost for such cameras may be extremely expensive. Moreover, consumers may be subject to additional costs because they will be required to subscribe to a video conferencing service. Service providers may also incur the expense of supporting these custom-built cameras and specialized device drivers. As a result, current technologies do not provide an efficient and cost-effective way to provide television-based video conferencing using a computing device.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

DETAILED DESCRIPTION OF EMBODIMENTS

Reference will now be made in detail to exemplary embodiments, examples of which are illustrated in the accompanying drawings. It should be appreciated that the same reference numbers will be used throughout the drawings to refer to the same or like parts. It should be appreciated that the following detailed description are exemplary and explanatory only and are not restrictive.

Exemplary embodiments may provide a system and method for providing television video conferencing. That is, exemplary embodiments may, among other things, expand and optimize television-based video conferencing within video and telecommunications environments by comprehensively and effectively providing television video conferencing using a media management tool on a computing device.

As discussed above, video encoding and decoding required for video conferencing may be processor-intensive and not well suited for television units and set-top-boxes, which typically lack the processing capabilities of current computing devices. Although custom-built, hi-tech cameras compatible with television units are available to consumers, cost for these cameras may be extremely high. Moreover, additional cost for supporting these custom cameras and special drivers, not to mention fees associated with video conferencing service subscriptions, may be incurred.

According to various embodiments, video conferencing using a computing device may provide a streamlined and cost-effective solution for an otherwise expensive and cumbersome television-based video conferencing feature. By using a media management tool at a computing device to provide television video conference may therefore eliminate or mitigate inefficiencies associated with traditional techniques and solutions.

It should be appreciated that the term, "video conference" or "video conferencing," as used herein, may refer to any form of interactive telecommunication technologies that allow users from two or more locations to interact via simultaneous multi-way video and audio transmissions. Although embodiments of the present disclosure are primarily discussed with respect to video and audio transmissions, it should be appreciated that video-only or audio-only transmissions may be provided. It should also be appreciated that other types of data transmissions may also provided using the video conferencing techniques described herein.

Figure 1:
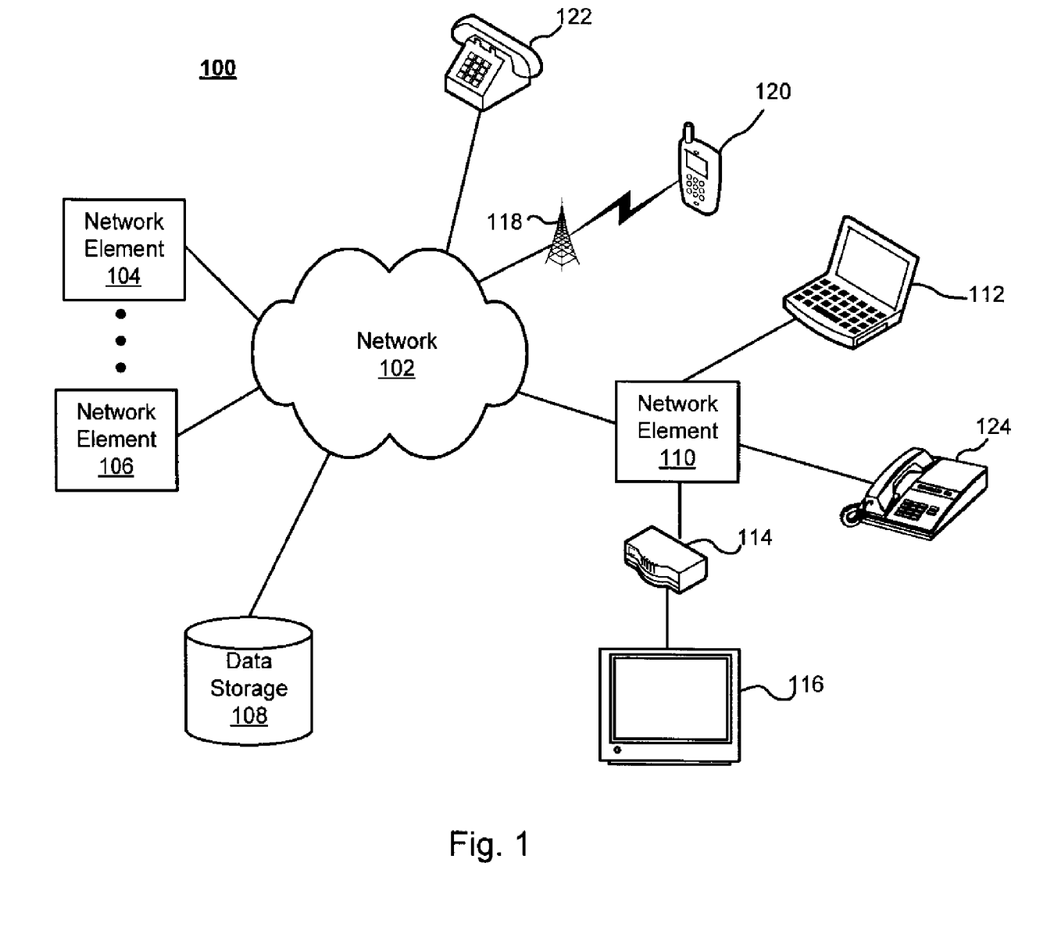
FIG. 1 depicts a block diagram of a system architecture for providing television video conferencing using a computing device, according to an exemplary embodiment.

FIG. 1 depicts a block diagram of a system architecture for providing television video conferencing using a computing device 100, according to an exemplary embodiment. As illustrated, network 102 may be communicatively coupled with one or more devices including network element 104, network element 106, data storage 108, and network element 110. Other devices may be communicatively coupled with network 102 via one or more intermediary devices, such as transceiver 118, network element 110, or a wireline phone 122. Wireless device 120 may be communicatively coupled with network 102 via transceiver 118. Network client 112 and set-top box 114 may be communicatively coupled with network 102 via network element 110. Wireless control 110 may be communicatively coupled with set-top box 114 via infrared, Bluetooth communication, or other wireless technologies. A video display (e.g., television set 116) may be communicatively coupled to set-top box 114. It should also be appreciated that other various components may also be communicatively coupled with the network element 110, such as a Voice over Internet Protocol ("VoIP") phone 124.

Network 102 may be a wireless network, a wired network or any combination of wireless network and wired network. For example, network 102 may include one or more of a fiber optics network, a passive optical network, a cable network, an Internet network, a satellite network (e.g., operating in Band C, Band Ku or Band Ka), a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11n and 802.11g or any other wired or wireless network for transmitting or receiving a data signal. In addition, network 102 may include, without limitation, telephone line, fiber optics, IEEE Ethernet 802.3, a wide area network ("WAN"), a local area network ("LAN"), or a global network such as the Internet. Also, network 102 may support, an Internet network, a wireless communication network, a cellular network, or the like, or any combination thereof. Network 102 may further include one, or any number of the exemplary types of networks mentioned above operating as a stand-alone network or in cooperation with each other. Network 102 may utilize one or more protocols of one or more network elements to which it is communicatively coupled. Network 102 may translate to or from other protocols to one or more protocols of network devices. Although network 102 is depicted as one network, it should be appreciated that according to one or more embodiments, network 102 may comprise a plurality of interconnected networks, such as, for example, a service provider network, the Internet, a broadcaster's network, a cable television network, corporate networks, or home networks.

Network elements 104, 106, 110, and data storage 108 may transmit and receive data to and from network 102 representing broadcast content, user request content, mobile communications data, or other data. The data may be transmitted and received utilizing a standard telecommunications protocol or a standard networking protocol. For example, one embodiment may utilize Session Initiation Protocol ("SIP"). In other embodiments, the data may be transmitted or received utilizing other Voice Over IP ("VOIP") or messaging protocols. For example, data may also be transmitted or received using Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet ("TCP/IP") Protocols, or other protocols and systems suitable for transmitting and receiving data. Data may be transmitted and received wirelessly or may utilize cabled network or telecom connections such as an Ethernet RJ45/Category 5 Ethernet connection, a fiber connection, a traditional phone wireline connection, a cable connection or other wired network connection. Network 102 may use standard wireless protocols including IEEE 802.11a, 802.11b and 802.11g. Network 102 may also use protocols for a wired connection, such as an IEEE Ethernet 802.3.

Transceiver 118 may be a repeater, a microwave antenna, a cellular tower, or another network access device capable of providing connectivity between to different network mediums. Transceiver 118 may be capable of sending or receiving signals via a mobile network, a paging network, a cellular network, a satellite network or a radio network. Transceiver 118 may provide connectivity to one or more wired networks and may be capable of receiving signals on one medium such as a wired network and transmitting the received signals on a second medium, such as a wireless network.

Wireless device 120 may be a mobile communications device, wireline phone, a cellular phone, a mobile phone, a satellite phone, a personal digital assistant ("PDA"), a computer, a handheld MP3 player, a handheld multimedia device, a personal media player, a gaming device, or other devices capable of communicating with network 102 via transceiver 118.

Network elements, transceiver 118, data storage 108, and set-top box 114 may include one or more processors for recording, transmitting, receiving, or storing data. Although network elements, transceiver 118 and data storage 108 are depicted as individual elements, it should be appreciated that the contents of one or more of a network element, transceiver 118, and data storage 108 may be combined into fewer or greater numbers of devices and may be connected to additional devices not depicted in FIG. 1. Furthermore, the one or more devices may be local, remote, or a combination thereof a first network elements, transceiver 118, and data storage 108.

Data storage 108 may be network accessible storage and may be local, remote, or a combination thereof to network elements 104, 106, and 110. Data storage 108 may utilize a redundant array of inexpensive disks ("RAID"), tape, disk, a storage area network ("SAN"), an internet small computer systems interface ("iSCSI") SAN, a Fibre Channel SAN, a common Internet File System ("CMS"), network attached storage ("NAS"), a network file system ("NFS"), or other computer accessible storage. In one or more embodiments, Data storage 108 may be a database, such as an Oracle database, a Microsoft SQL Server database, a DB2 database, a MySQL database, a Sybase database, an object oriented database, a hierarchical database, or other database. Data storage 108 may utilize flat file structures for storage of data.

Network elements 104, 106, and 110 may be one or more servers (or server-like devices), such as a Session Initiation Protocol ("SIP") server. Network elements 104, 106, and 110 may include one or more processors (not shown) for recording, transmitting, receiving, or storing data. According to one or more embodiments, network elements 104, 106, and 110 may be servers providing media content to one or more users. In other embodiments, network elements 104, 106, and 110 may be servers that provide network connection between two or more wireless devices 118. Network elements 104, 106, and 110 may also be servers of a service provider, the Internet, a broadcaster, a cable television network, or another media provider.

Network element 110 may be a residential gateway, such as a router, an optical network terminal or another piece of Customer Premises Equipment ("CPE") providing access to one or more pieces of equipment. For example, network element 110 may provide audio/video programming content feeds to a set-top box, such as set-top box 116. Network element 110 may also provide network connectivity for other clients, such as a Voice Over IP ("VOIP") phone (not shown) and a network client, e.g., network client 112.

Network client 112 may be a desktop computer, a laptop computer, a server, a personal digital assistant, or other computer capable of sending or receiving network signals (e.g., CPE, a television, radio, phone, appliance, etc.). Network client 112 may use a wired or wireless connection. It should also be appreciated that the network client 112 may be a portable electronic device capable of being transported. For example, these may include a digital picture frame, an electronic reader device, or other portable device. Such a device may transmit or receive signals and store information in transit, and in the event it is transported out of the unit, the portable electronic device may still operate using the data (e.g., digital image, electronic book, etc.) it stored. Although depicted as connected via a residential gateway in FIG. 1, it should be appreciated that the network client 112 may connect directly to network 102 or via other network connectivity devices as well. According to one or more embodiments, network client 112 using a wireless connection may authenticate with a network using Wired Equivalent Privacy ("WEP"), Wi-Fi Protected Access ("WPA"), or other wireless network security standards.

System 100 may be used for mobile telecommunications between two or more components of the system 100, e.g., two or more wireless devices, wireless device with network client, set top box with wireless device, landline phone, VoIP, etc. System 100 may also be used for transmitting or receiving a variety of content. The various components of system 100 as shown in FIG. 1 may be further duplicated, combined or integrated to support various applications and platforms. Additional elements may also be implemented in the systems described above to support various applications. It should be appreciated that the term, "computing device," as used herein, may refer to any component associated with system 100, as described above. These may include, but are not limited to, vendor-side components 104-108, subscriber-side components 110-124, or any other device communicatively coupled to network 102 or association with system 100.

Figure 2:
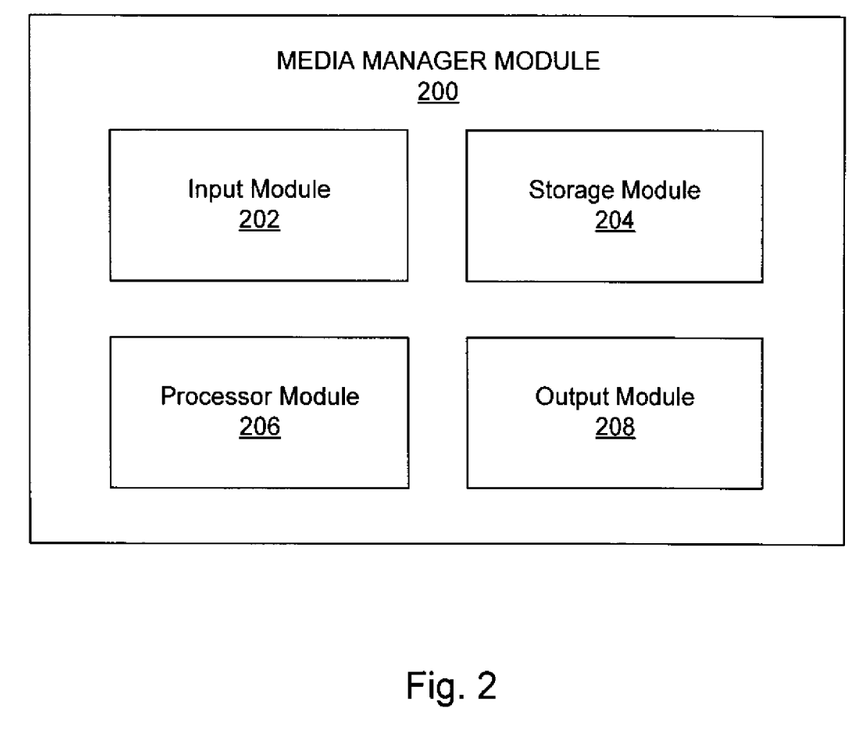
FIG. 2 depicts a hardware module component of a system for providing television video conferencing using a computing device, according to an exemplary embodiment.

FIG. 2 depicts a hardware module component of a system for providing television video conferencing using a computing device 200, according to an exemplary embodiment. Referring to FIG. 2, there is shown a media management module 200 for providing television video conferencing using a computing device. As illustrated, the media management module 200 may comprise one or more components, such as an input module 202, a storage module 204, a processor module 206, and an output module 208. Although the media management module 200 is depicted as a single module, the media management module 200 may be incorporated as a single component or may be distributed across a plurality of physical components, such as one or more centralized servers, pieces of customer premises equipment, or end user devices. In some embodiments, the media management module 200 may be utilized in a virtual environment or as software.

Input module 202 may receive one or more inputs. These may include video and audio data from a camera communicatively coupled to a computing device. Storage module 204 may manage or access the one or more inputs using electronic storage, including databases or other organized electronic storage. Storage module 204 may provide one or more interfaces for the input module 202, processor module 206, or output module 208. Storage module 204 may store any data associated with the input module 202, processor module 206, and output module 208. Storage module 204 may be or may be communicatively coupled to one or more physical media, such as, but not limited to, a data storage unit, a server, a compact disc (CD), a digital versatile disc (DVD), a floppy disk, a hard drive, read only memory (ROM), random access memory (RAM), as well as other physical media capable of storing software, data, other storage information, or combinations thereof.

Processor module 206 may process the data. For example, processor module 206 may comprise encoding capabilities to convert raw video and raw audio data received at the input module 202 into various encoded multimedia streams. Other various data processing operations may also be provided at the processor module 206.

Output module 208 may transmit a variety of data. For example, the output module 208 may transmit one or more multimedia streams processed by the processor module 206 to a television unit, set-top box, or other device remote to the output module 208. The output module 208 may also transmit various registration information to a Video Hub Office (VHO) server or data directly to one or more remote computing devices when a video conferencing is registered and established. Other various functions and features may also be provided.

It should be appreciated that the system 100 of FIG. 1 and the system 200 of FIG. 2 may be implemented in a variety of ways. The architectures 100 and 200 may be implemented as a hardware component (e.g., as a module) within a network element or network box. It should also be appreciated that the architectures 100 and 200 may be implemented in computer executable software (e.g., on a computer-readable medium). Although depicted as a single architecture, module functionality of the architectures 100 and 200 may be located on a single device or distributed across a plurality of devices including one or more centralized servers and one or more pieces of customer premises equipment or end user devices.

Figure 3:
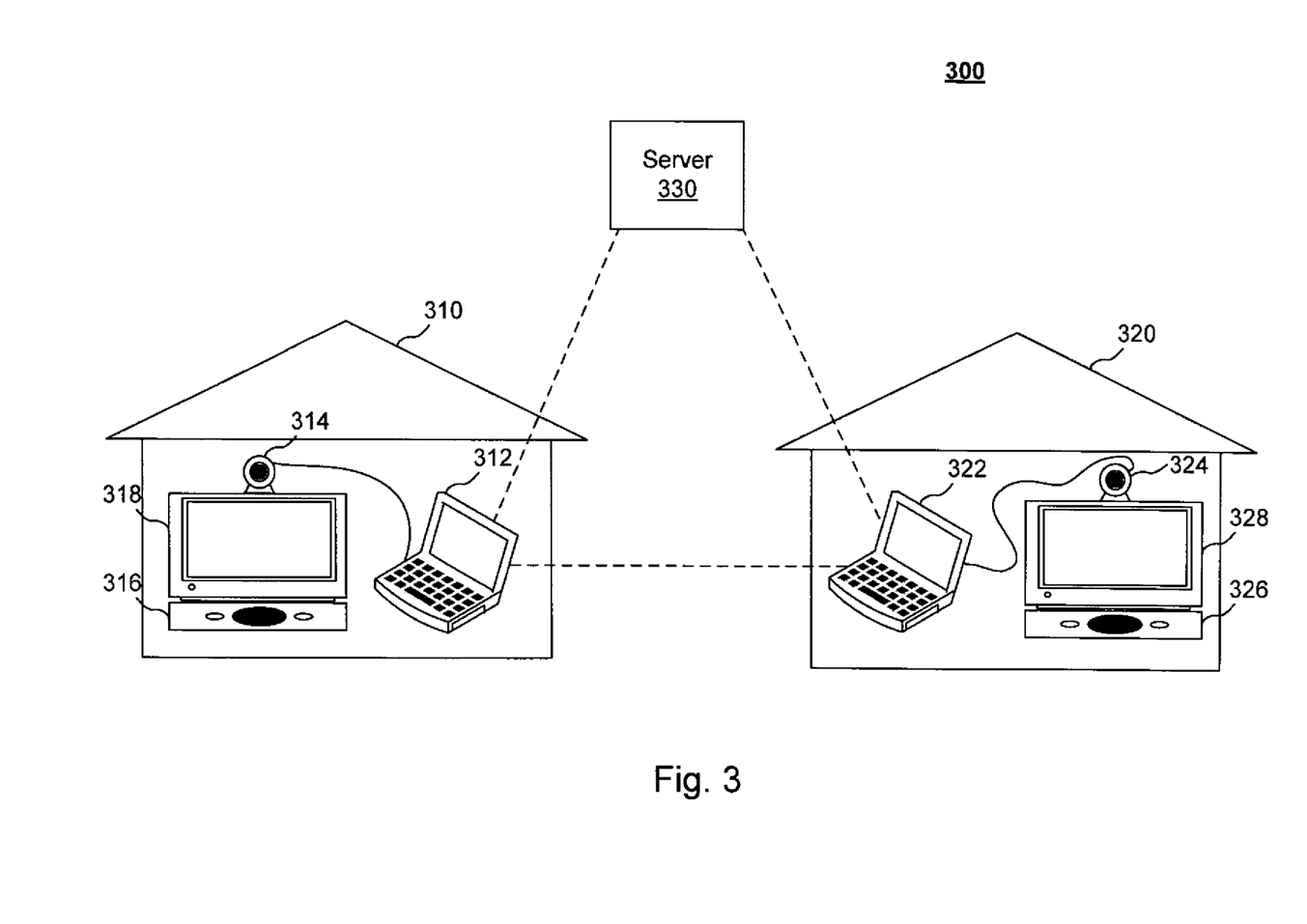
FIG. 3 depicts an illustrative system diagram for providing television video conferencing using a computing device, according to an exemplary embodiment.

FIG. 3 depicts an illustrative system diagram for providing television video conferencing using a computing device 100, according to an exemplary embodiment. In this system diagram 300, a first user at a first location 310 may want to establish a video conferencing session with a second user at a second location 320. The first location 310 may comprise a computing device 312 (e.g., a notebook computer) communicatively coupled to a camera 314 (e.g., a webcam) via a wired or wireless connection. The computing device 312 may also be communicatively coupled to a set-top box 316 or a television 318 via a local area network. In some embodiments, a Broadband Home Router (BHR) may used to establish the local area network or to communicatively couple the computing device 312 with the other components, such as the set-top box (STB) 316. It should be appreciated that each of these components may be communicatively coupled to each other via one or more of the methods described above with respect to the components of system 100 of FIG. 1.

Similar to the first location 310, the second location 320 may comprise a computing device 322 (e.g., a notebook computer) communicatively coupled to a camera 324 (e.g., a webcam) via a wired or wireless connection. The computing device 322 may also be communicatively coupled to a set-top box 326 or a television 328 via a local area network. In some embodiments, a Broadband Home Router (BHR) may used to establish the local area network or to communicatively couple the computing device 322 with the other components, such as the set-top box (STB) 326. It should be appreciated that each of these components may be communicatively coupled to each other via one or more of the methods described above with respect to the components of system 100 of FIG. 1.

In some embodiments, the media management module 200 may be communicatively coupled to computing device 312 and computing device 322. When a user at the first location 310 wants to establish a video conference with the user at the second location, the media management module 200 at the computing device 312 may transmit registration information to a Video Hub Office (VHO) server 330. The VHO server 330 may be a VHO presence server capable of detecting that a user is present at his or her computing device 312, 322 for establishing the video conferencing session. The registration information may include IP and port information so that the VHO server 330 may maintain a mapping of customer/user name and IP/port of the computing device 312. It should be appreciated that in order to proceed with establishing the video conferencing session, the computing device 322 at the second location 320 may also transmit registration information, e.g., IP and port information, to the VHO server 330.

It should be appreciated that registration information transmitted by the computing devices 312, 322 may be performed via a variety of ways, such as User Datagram Protocol (UDP), Transmission Control Protocol/Internet Protocol (TCP/IP), or other transmission protocol.

It should also be appreciated that the Broadband Home Router (BHR) may keep the firewall open in order to establish and conduct the video conferencing session. In some embodiments, the media management module 200 may re-register itself with the VHO server 330 at predetermined intervals to keep the firewall or other security feature open. In some embodiments, the predetermined interval time may be 60 seconds. It should be appreciated that the predetermined interval time may be greater or lesser as well.

Once a video conferencing session is established between the computing device 312 at the first location 310 and the computing device 322 at the second location 320, the media management module 200 may coordinate with each computing device 312, 322 to directly transmit and receive multimedia data between the computing devices 312, 322.

It should be appreciated that while embodiments described above are directed to the media management module 200 as communicatively coupled to the computing devices 312, 322, the media management module 200 may also be communicatively coupled to the cameras 314, 324, the set-top boxes 316, 326, or the televisions 318, 328. It should also be appreciated that, in some embodiments, the media management module 200 may be fully or partially integrated with these components, or entirely as a stand-alone component.

Figure 4A:
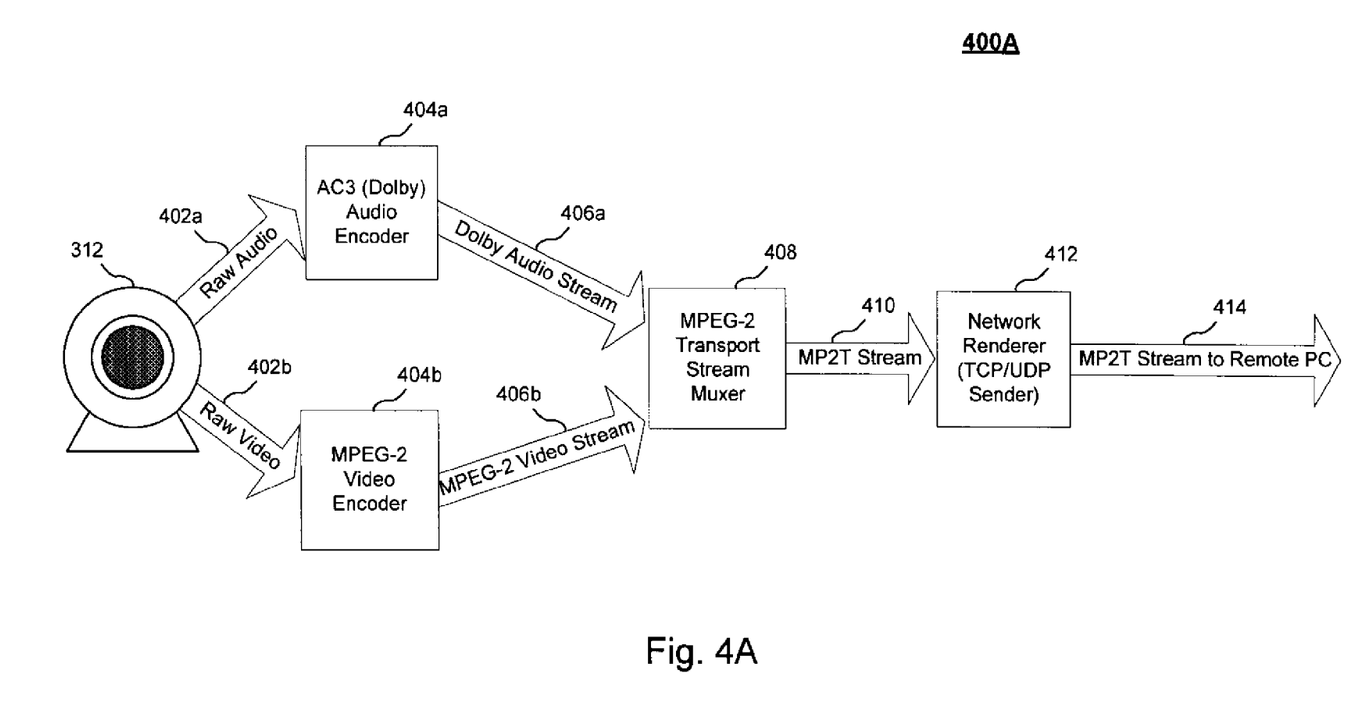
FIG. 4A depicts an illustrative flow for providing television video conferencing using a computing device, according to an exemplary embodiment.

FIG. 4A depicts an illustrative flow for providing television video conferencing using a computing device 400A, according to an exemplary embodiment. In this example, the camera 312, 322 may capture raw data. It should be appreciated that although a video- and audio-enabled camera 312, 322 is used to capture the raw data, other various inputs may be used, such as a video-only camera and a stand-along microphone. Other various input configurations may also be provided.

Once captured, the raw data may be received by the input module 202. In some embodiments, the raw data may be multimedia data, such as audio data 402a and video data 402b. The processor 206 may use at least one audio encoder 404a to convert the raw audio data 402a into an audio stream 406a and at least one video encoder 404b to convert the video data 402b into a video stream 406b. In some embodiments, the at least one audio encoder 404a may be an AC3 (Dolby) audio encoder configured to convert the audio stream 406a into a Dolby audio stream. In some embodiments, the at least one video encoder 404b may be an MPEG-2 video encoder configured to convert the video stream 406a into an MPEG-2 video stream. It should be appreciated that other various encoders may also be utilized, such as AAC (Advanced Audio Coding) audio encoder, MPEG-4 or H264 video encoders etc.

Once the raw data is converted to respective audio and video streams, the processor module 206 may combine the streams into one MPEG-2 transport (MP2T) stream 410 using one or more multiplexing/demultiplexing functions 408. The MP2T stream 410 may then be processed by a network renderer 412 at the processing module 206. The network renderer 412 may format the MP2T stream 410 so that it is capable of being transmitted to a remote computing device 414 for the video conferencing session, such as the computing device 322 at the second location 320.

Figure 4B:
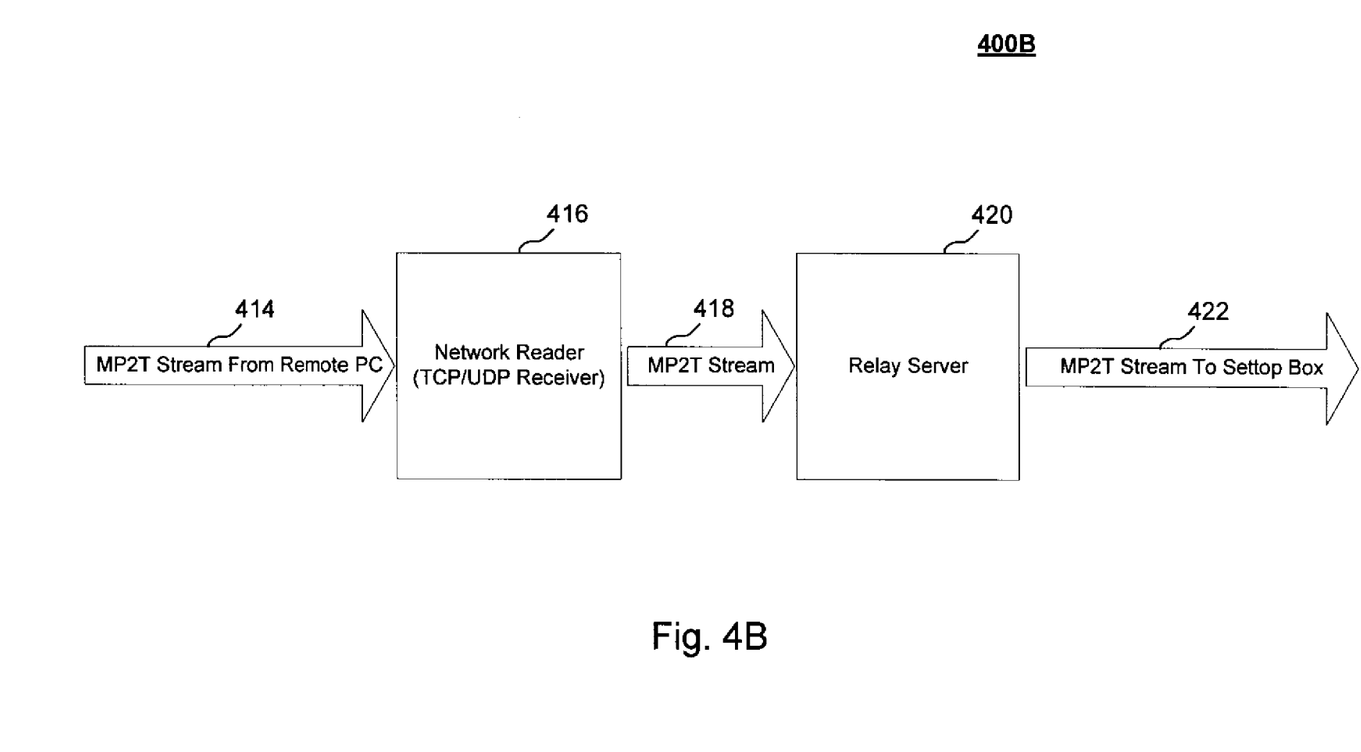
FIG. 4B depicts an illustrative flow for providing television video conferencing using a computing device, according to an exemplary embodiment.

FIG. 4B depicts an illustrative flow for providing television video conferencing using a computing device 400B, according to an exemplary embodiment. In this example, the MP2T stream 410 may then be received from computing device 312 at the first location 310 by the computing device 322 at the second location 320. A network reader 416 at the computing device 322 reformat the MP2T stream 414 so that it is capable of being transmitted 418 to a relay server 420. From the relay server, the MP2T stream may be transmitted to the set-top box 326 for output at the television 328 at the second location.

Although FIGS. 4A-4B show data flow 400A, 400B in one direction, e.g., from the computing device 312 at the first location 310 to the computing device 322 at the second location 320, it should be appreciated that flow 400A, 400B may be bidirectional and may be simultaneously bidirectional so that real-time or near real-time video conferencing may be established.

It should be appreciated that the media management module 200 may also allow a user to create and display a contact, buddy, or friends list in a set-top box or television. In some embodiments, the media management module 200 may also provide a user to indicate his or her current status (e.g., online, offline, away, busy, etc.) and the user may see the status of each of his or her friends as well.

The media management module 200 may be further configured to present a message (e.g., in a pop-up window) on a television whenever a friend powers on his or her set-top box or television. Either party may initiate a video conference by sending an invite to the VHO server 330. The invite may be a message comprising information about the inviter's set-top box type (e.g., MPEG-2 or MPEG-4). The VHO server 330 may retrieve the IP/port information of the invitee from its database or other source and forward the invite to the invitee's computing device.

The invitee may choose to accept or reject the video conference. If accepted, a 200 OK message may be sent to the inviter. The OK message may contain information about the invitee's type of set-top box. The information about each party's set-top box may be used to facilitate direct exchange of multimedia data by properly encoding/decoding so that transmissions are compatible with the various devices and components.

Other various embodiments and considerations may also be provided to optimize the television video conferencing using a computing device described above. It should be appreciated that while embodiments are primarily directed to television-based video conferencing, other various types of conferencing or communication may also be provided. These may include audio communications, chatroom or texting environments, platforms for data exchange or sharing, etc. It should also be appreciated that conferencing using the television video conferencing using a computing device may be configured for operation by one or more customers, analysts, operators, or administrators. In other embodiments, the television video conferencing using a computing device may be entirely automatic or may be a combination of manual and automatic features.

While depicted as various servers, components, elements, modules, or devices, it should be appreciated that embodiments may be constructed in software or hardware, as a separate or stand-alone device, or as part of an integrated system, device, or tool.

Additionally, it should also be appreciated that system support and updating the various components of the system may be achieved. For example, a system administrator may have access to one or more of the components of the system, network, components, elements, or device. It should also be appreciated that the one or more servers, components, elements, or devices of the system may not be limited to physical components. These components may be computer-implemented software-based, virtual, etc. Moreover, the various servers, components, elements, or devices may be customized to perform one or more additional features and functionalities. Such features and functionalities may be provided via deployment, transmitting or installing software or hardware.

It should also be appreciated that each of the communications devices, servers, modules, or network elements may include one or more processors. It should be appreciated that one or more data storage systems (e.g., databases) may also be coupled to each of the devices or servers of the system. In one embodiment, the one or more data storage systems may store relevant information for each of the servers and system components. It should also be appreciated that software may be implemented in one or more computer processors, modules, network components, services, devices, or other similar systems.

It should be appreciated that the contents of any of these one or more data storage systems may be combined into fewer or greater numbers of data storage systems and may be stored on one or more data storage systems or servers. Furthermore, the data storage systems may be local, remote, or a combination thereof to client systems, servers, or other system components. In another embodiment, information stored in the databases may be useful in providing additional personalizations and customizations.

By providing television video conferencing using a computing device according to the above embodiments, a more efficient and easy-to-use way for establishing and conducting video conferencing sessions may be achieved. Improved resource management and cost efficiencies may also be realized.

Figure 5:
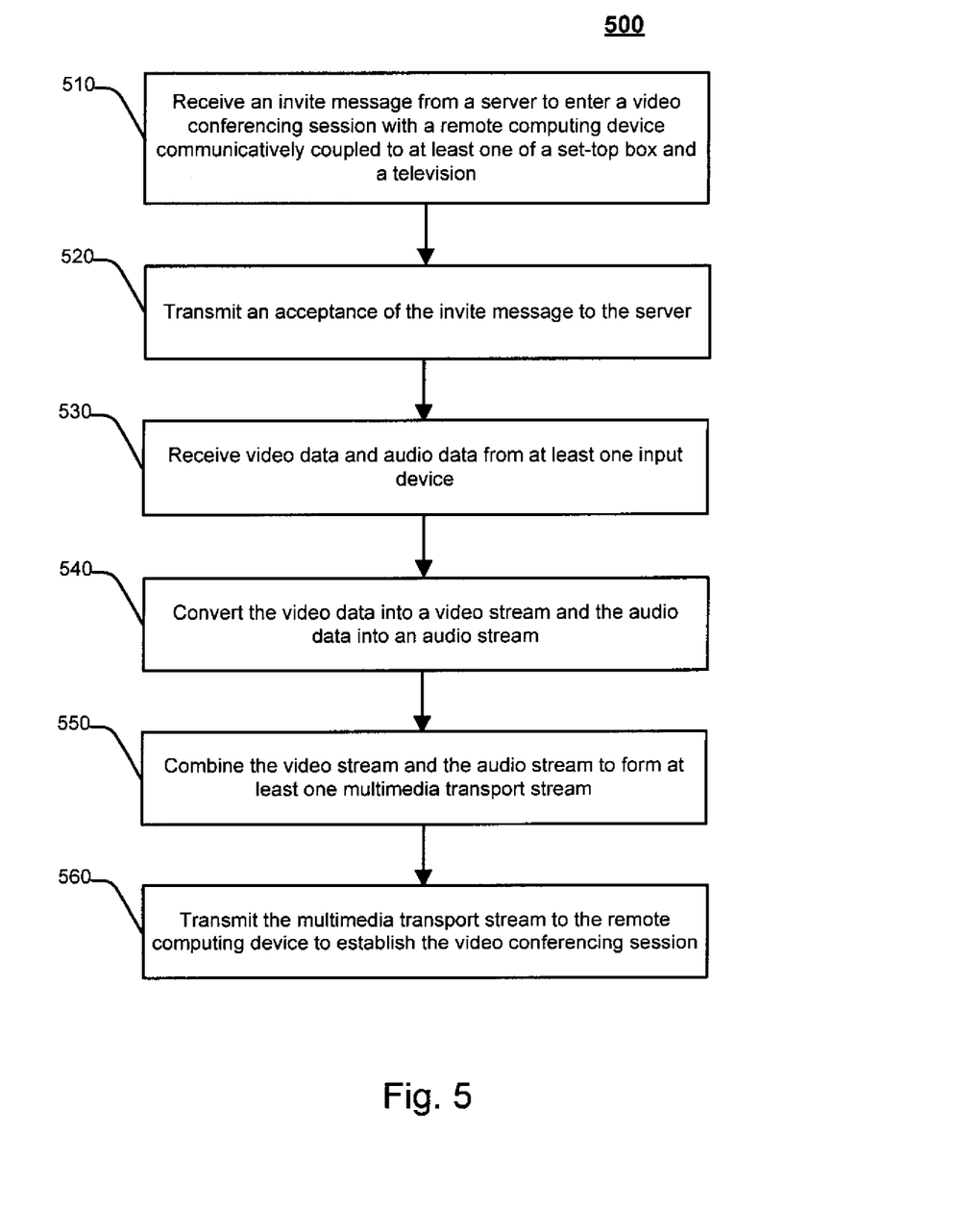
FIG. 5 depicts an illustrative flowchart of a method for accepting an invitation for a television video conferencing using a computing device, according to an exemplary embodiment.

FIG. 5 depicts an illustrative flowchart of a method for accepting an invitation for a television video conferencing using a computing device, according to an exemplary embodiment. The exemplary method 500 is provided by way of example, as there are a variety of ways to carry out methods disclosed herein. The method 500 shown in FIG. 5 may be executed or otherwise performed by one or a combination of various systems. The method 500 is described below as carried out by at least system 200 in FIG. 2 and system 300 in FIG. 3, by way of example, and various elements of systems 200 and 300 are referenced in explaining the exemplary method of FIG. 5. Each block shown in FIG. 5 represents one or more processes, methods, or subroutines carried in the exemplary method 500. A computer readable medium comprising code to perform the acts of the method 500 may also be provided. Referring to FIG. 5, the exemplary method 500 may begin at block 510.

At block 510, the input module 202 may be configured to receive an invite message from a server to enter a video conferencing session with a remote computing device communicatively coupled to at least one of a set-top box and a television. In some embodiments, the invite message may comprise information associated with the remote computing device. For example, the information may IP data, port information, user identification, or a combination thereof. In some embodiments, the server may be a presence server configured to determine whether the at least one of a set-top box and a television is powered on.

At block 520, the output module 208 may be configured to transmit an acceptance of the invite message to the server.

At block 530, the input module 202 may be configured to receive video data and audio data from a local input device. In some embodiments, the local input device may be web camera comprising video and audio input capabilities. Other various input device may also be used, such as microphones, mobile communication devices, etc.

At block 540, the processor module 206 may be configured to convert the video data into a video stream and the audio data into an audio stream. In some embodiments, the processor module may convert the video data into a video stream using a video encoder and the audio data into an audio stream using an audio encoder. For example, the video encoder may be an MPEG-2 or MPEG-4 video encoder and the audio encoder may be an AC3 (Dolby) or AAC (Advanced Audio Coding) audio encoder. Other various encoders, codecs, compressors, encryptors, or combinations thereof may also be used.

At block 550, the processor module 206 may be configured to combine the video stream and the audio stream to form at least one multimedia transport stream. In some embodiments, the processor module may combine the video stream and the audio stream into one multimedia transport stream using one or more multiplexing/demultiplexing techniques to join or link the video stream and the audio stream. It should be appreciated that one or more additional components may be used to assist the processor module 206 in this action.

At block 560, the processor module 206 may be configured to transmit the multimedia transport stream to the remote computing device to establish the video conferencing session.

It should be appreciated the input module 202, the processor module 206, and the output module 208 are directed to processing and communicating within User Datagram Protocol (UDP), other protocols or environments may also be used, such as Transmission Control Protocol (TCP).

Figure 6:
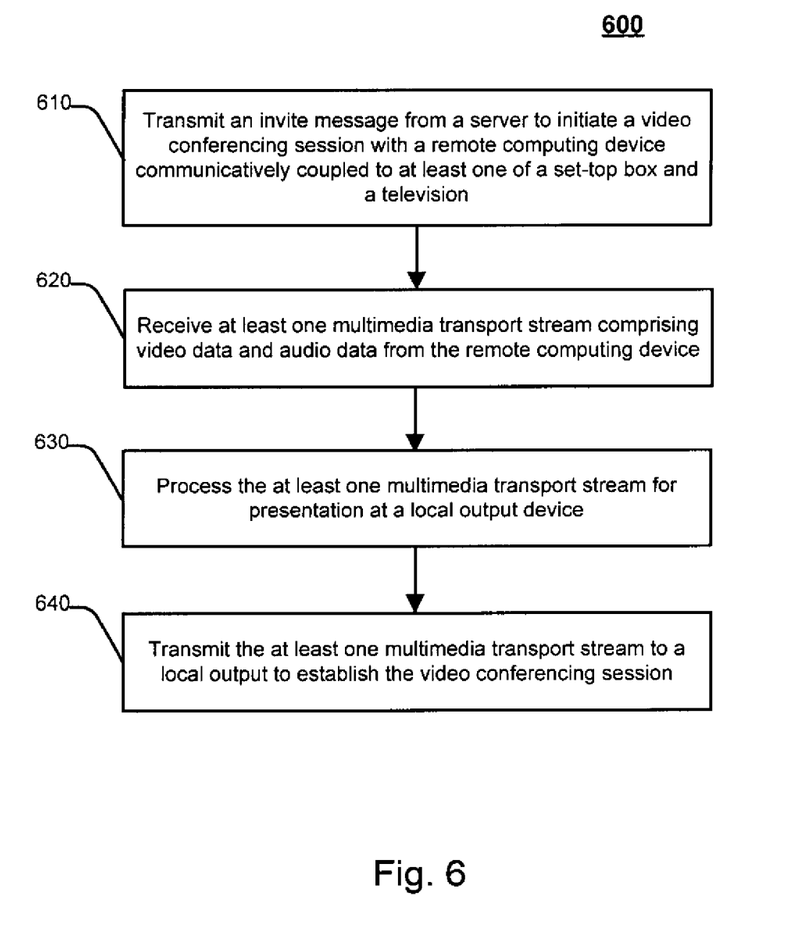
FIG. 6 depicts an illustrative flowchart of a method for initiating a television video conferencing using a computing device, according to an exemplary embodiment.

FIG. 6 depicts an illustrative flowchart of a method for initiating a television video conferencing using a computing device, according to an exemplary embodiment. The exemplary method 600 is provided by way of example, as there are a variety of ways to carry out methods disclosed herein. The method 600 shown in FIG. 6 may be executed or otherwise performed by one or a combination of various systems. The method 600 is described below as carried out by at least system 200 in FIG. 2 and system 300 in FIG. 3, by way of example, and various elements of systems 600 and 600 are referenced in explaining the exemplary method of FIG. 6. Each block shown in FIG. 6 represents one or more processes, methods, or subroutines carried in the exemplary method 600. A computer readable medium comprising code to perform the acts of the method 600 may also be provided. Referring to FIG. 6, the exemplary method 600 may begin at block 610.

At block 610, the output module 208 may be configured to transmit an invite message to a server to initiate a video conferencing session with a computing device communicatively coupled to at least one of a set-top box and a television. In some embodiments, the invite message may comprise information associated with a local computing device communicatively coupled to the local output device. For example, the information may IP data, port information, user identification, or a combination thereof. In some embodiments, the server may be a presence server configured to determine whether the at least one of a set-top box and a television is powered on.

At block 620, the input module 202 may be configured to receive at least one multimedia transport stream comprising video data and audio data from the remote computing device.

At block 630, the processor module 206 may be configured to process the at least one multimedia transport stream for presenting at a local output device. At block 640, the output module may be configured to transmit the at least one multimedia transport stream to a local output device to establish the video conferencing session. In some embodiments, the local output device may be a local set-top box or a local television.

It should be appreciated the input module 202, the processor module 206, and the output module 208 are directed to processing and communicating within User Datagram Protocol (UDP), other protocols or environments may also be used, such as Transmission Control Protocol (TCP). As discussed above, it should also be appreciated that the media manager may re-register itself with the video hub office (VHO) server at predetermined intervals to keep a firewall or other security feature open at a broadband home router (BHR) in order to continue the established the video conferencing session.

It should be appreciated that the set of instructions, e.g., the software, that configures the computer operating system to perform the operations described above may be contained on any of a wide variety of media or medium, as desired. Further, any data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by a computer.

In summary, embodiments may provide a system and method for comprehensively and effectively providing an television video conferencing using a computing device. It should be appreciated that although embodiments are described primarily with systems management technologies, the systems and methods discussed above are provided as merely exemplary and may have other various applications and implementations.

It should also be appreciated that a "remote" computer device, as used herein, may generally refer to all computing devices not within the same local area network (LAN) of the set-top box or television unit. In some embodiments, a "remote" computing device may also refer to a computing device that is remote to the set-top box or television unit. While embodiments described above should clearly recite how a "remote" computing device interacts with any of the components of system 100 and 200, it should be appreciated that the term "remote" may have several meaning and be viewed in context.

In the preceding specification, various embodiments have been described with reference to the accompanying drawings. It will, however, be evident that various modifications and changes may be made thereto, and additional embodiments may be implemented, without departing from the broader scope of the disclosure as set forth in the claims that follow. The specification and drawings are accordingly to be regarded in an illustrative rather than restrictive sense.

I claim:

1. A system, comprising:
    an input module of a media manager configured to receive an invite message from a video hub office (VHO) server to enter a video conferencing session with a remote computing device communicatively coupled to at least one of a remote set-top box and a remote television, and to receive video data and audio data from a local input device, the media manager comprising a local computing device, the local computing device being communicatively coupled to a local output device, the local output device being separate from the local computing device and the media manager, and the local output device comprising at least one of a local set-top box and a local television; and
    a processor module of the media manager configured to convert the video data into a video stream and the audio data into an audio stream, and to combine the video stream and the audio stream to form at least one multimedia transport stream; and
    an output module of the media manager configured to transmit an acceptance of the invite message to the video hub office (VHO) server, and to transmit the multimedia transport stream to the remote computing device to establish the video conferencing session.

2. The system of claim 1, wherein the invite message comprises information associated with the remote computing device, the information comprising at least one of IP data, port information, and user identification.

3. The system of claim 1, wherein the video hub office (VHO) server is a presence server configured to determine whether the at least one of the remote set-top box and the remote television is powered on.

4. The system of claim 1, wherein the local input device is web camera comprising video and audio input capabilities.

5. The system of claim 1, wherein the processor module converts the video data into a video stream using a video encoder and the audio data into an audio stream using an audio encoder.

6. The system of claim 1, wherein the processor module combines the video stream and the audio stream into one multimedia transport stream by multiplexing/demultiplexing the video stream and the audio stream.

7. The system of claim 1, wherein the input module and the output module communicate via at least one of User Datagram Protocol (UDP) and Transmission Control Protocol (TCP).

8. The system of claim 1, wherein the media manager re-registers with the video hub office (VHO) server at predetermined intervals to keep a firewall or other security feature open at a broadband home router (BHR) in order to continue the established video conferencing session.

9. A method, comprising:
    receiving, at an input module of a media manager, an invite message from a video hub office (VHO) server to enter a video conferencing session with a remote computing device communicatively coupled to at least one of a remote set-top box and a remote television, the media manager comprising a local computing device, the local computing device being communicatively coupled to a local output device, the local output device being separate from the local computing device and the media manager, and the local output device comprising at least one of a local set-top box and a local television;
    transmitting, by an output module of a media manager, an acceptance of the invite message to the video hub office (VHO) server;
    receiving, at the input module, video data and audio data from a local input device;
    converting, at a processor module of the media manager, the video data into a video stream and the audio data into an audio stream;
    combining, at the processor module, the video stream and the audio stream to form at least one multimedia transport stream; and
    transmitting, by the output module of the media manager, the multimedia transport stream to the remote computing device to establish the video conferencing session.

10. The method of claim 9, wherein the invite message comprises information associated with the remote computing device, the information comprising at least one of IP data, port information, and user identification.

11. The method of claim 9, wherein the local input device is web camera comprising video and audio input capabilities.

12. The method of claim 9, wherein the processor module converts the video data into a video stream using a video encoder and the audio data into an audio stream using an audio encoder.

13. The method of claim 9, wherein the processor module combines the video stream and the audio stream into one multimedia transport stream by multiplexing/demultiplexing the video stream and the audio stream.

14. The system of claim 9, wherein the media manager re-registers with the video hub office (VHO) server at predetermined intervals to keep a firewall or other security feature open at a broadband home router (BHR) in order to continue the established the video conferencing session.

15. A non-transitory computer readable medium comprising code which when executed causes a computer to perform the method of claim 9.

16. A system, comprising:
an output module of a media manager configured to transmit an invite message to a video hub office (VHO) server to initiate a video conferencing session with a remote computing device communicatively coupled to at least one of a remote set-top box and a remote television, the media manager comprising a local computing device, the local computing device being communicatively coupled to a local output device separate from the local computing device and the media manager, and the local output device comprising at least one of a local set-top box and a local television;
an input module of the media manager configured to receive at least one multimedia transport stream comprising video data and audio data from the remote computing device;
a processor module of the media manager configured to process the at least one multimedia transport stream for presenting at the local output device, and to instruct the output module to transmit the at least one multimedia transport stream to the local output device to establish the video conferencing session.

17. The system of claim 16, wherein the invite message comprises information associated with the local computing device communicatively coupled to the local output device, the information comprising at least one of IP data, port information, and user identification.

18. The system of claim 16, wherein the video hub office (VHO) server is a presence server configured to determine whether the at least one of the remote set-top box and the remote television is powered on.

19. The system of claim 16, wherein the input module and the output module communicate via at least one of User Datagram Protocol (UDP) and Transmission Control Protocol (TCP).

20. The system of claim 16, wherein the media manager re-registers with the video hub office (VHO) server at predetermined intervals to keep a firewall or other security feature open at a broadband home router (BHR) in order to continue the established the video conferencing session.

21. A method, comprising:
transmitting, by an output module of a media manager, an invite message to a video hub office (VHO) server to initiate a video conferencing session with a remote computing device communicatively coupled to at least one of a remote set-top box and a remote television, the media manager comprising a local computing device, the local computing device being communicatively coupled to a local output device, the local output device being separate from the local computing device and the media manager, and the local output device comprising at least one of a local set-top box and a local television;
receiving, at an input module of the media manager, at least one multimedia transport stream comprising video data and audio data from the remote computing device;
processing, by a processor module of the media manager, the at least one multimedia transport stream for presenting at the local output device;
transmitting, by the output module, the at least one multimedia transport stream to the local output device to establish the video conferencing session.

22. The method of claim 21, wherein the invite message comprises information associated with the local computing device communicatively coupled to the local output device, the information comprising at least one of IP data, port information, and user identification.

23. The system of claim 21, wherein the media manager re-registers with the video hub office (VHO) server at predetermined intervals to keep a firewall or other security feature open at a broadband home router (BHR) in order to continue the established the video conferencing session.

24. A non-transitory computer readable medium comprising code which when executed causes a computer to perform the method of claim 21.

25. The system of claim 1, wherein the media manager is further configured to present a message on the local output device whenever the remote set-top box or remote television is powered on.

* * * * *